US 6,536,659 B1

(12) United States Patent
Hauser et al.

(10) Patent No.: US 6,536,659 B1
(45) Date of Patent: Mar. 25, 2003

(54) FACILITATING RETURNS OF MERCHANDISE PURCHASED FROM OTHER SOURCES

(75) Inventors: O. Shannon Hauser, Bellevue, WA (US); Billy H. Snipes, Social Circle, GA (US); Stephen S. Sugiyama, Seattle, WA (US); Christine O. Adkinson, Woodinville, WA (US)

(73) Assignee: Returns Online, Inc., Mercer Island, WA (US)

( * ) Notice: Subject to any disclaimer, the term of this patent is extended or adjusted under 35 U.S.C. 154(b) by 261 days.

(21) Appl. No.: 09/713,421

(22) Filed: Nov. 15, 2000

(51) Int. Cl.[7] .......................... G06F 17/00; G06F 17/60; G06K 15/00
(52) U.S. Cl. ..................... 235/375; 235/383; 235/385
(58) Field of Search .................. 235/375, 383, 235/385; 705/21, 24, 26, 28, 74, 76, 408

(56) References Cited

U.S. PATENT DOCUMENTS

| 4,967,906 A | * | 11/1990 | Morello et al. .......... 206/387.1 |
| 5,042,686 A | * | 8/1991 | Stucki ...................... 194/217 |
| 5,257,741 A | * | 11/1993 | Rode et al. ................ 241/100 |
| 6,018,719 A | * | 1/2000 | Rogers et al. .............. 705/21 |
| 2002/0010689 A1 | * | 1/2002 | Tibbs et al. ................ 705/408 |
| 2002/0019785 A1 | * | 2/2002 | Whitman .................... 705/28 |
| 2002/0138356 A1 | * | 9/2002 | Dutta et al. ................. 705/26 |

FOREIGN PATENT DOCUMENTS

JP         59049659 A    *  3/1984   ........... G06F/15/21

* cited by examiner

Primary Examiner—Thien M. Le
Assistant Examiner—April Nowlin
(74) Attorney, Agent, or Firm—Ronald M. Anderson

(57) ABSTRACT

A method for handling goods returned by customers of a plurality of different merchants. Merchants who have authorized return of merchandise transmit data identifying the customer and the merchandise to be returned to a central return facility for inclusion in a database. Customers of these merchants package the merchandise to be returned and are provided with a return authorization shipping label by the central return facility. This label includes a scannable bar code identifying the merchant and the customer. After the merchandise is received at the central returns facility, the scannable bar code is scanned so that the merchandise can be sorted by merchant, and the merchandise is then inspected to determine if the merchandise authorized for return has been received. If so, the appropriate merchant is advised, and the customer is electronically credited for the return of the merchandise. A bar code tag is attached to the returned merchandise that has been received to facilitate automated sorting on a conveyer system. The merchandise is thus directed to a storage bin for temporary storage along with other merchandise designated for the same disposition. When a bin is full, the merchandise contained therein is disposed of as designated.

32 Claims, 5 Drawing Sheets

FACILITATING RETURNS OF MERCHANDISE PURCHASED FROM OTHER SOURCES

FIELD OF THE INVENTION

This invention generally refers to a method and system for handling returned merchandise, and more specifically, to a method and system for receiving returned merchandise and efficiently processing it for appropriate disposition.

BACKGROUND OF THE INVENTION

One of the more troublesome problems that a merchant who sells merchandise to a customer must address is handling returns of merchandise sold to a customer. This problem is particularly significant for merchants who sell online to Internet customers, or through catalog orders, since such merchants typically do not have a local facility at which the merchandise can be physically returned by a customer. Yet, even for conventional "brick and mortar" businesses, the problems associated with handling returned merchandise can be a tremendous burden. An independent survey has determined that 30% of online retailers believe their biggest fulfillment challenge in the year 2001 will be accepting online returns. The importance of this issue should be fully appreciated, since 47% of those surveyed have indicated that they choose not to shop online because they can't return items easily. Whether a shopper is returning merchandise purchased online, or through a catalog transaction, or from a conventional store, the inconvenience of the process can have a significant adverse effect on customer loyalty. Providing prompt and efficient handling of returned merchandise helps to ensure the continued patronage of customers.

Several aspects of handling returned goods cause most of the problems for merchants. A merchant must provide personnel and facilities for processing and handling returned merchandise, which can add substantial overhead to the operation of a business. When goods are returned, they must be checked to determine their condition and to determine if the customer has actually returned the goods purchased from the merchant, or has omitted any portion of the goods that were to have been returned. These steps are essential to ensure that the customer is promptly credited for the cost of the returned goods, but is not credited if the condition and/or contents of the merchandise received are not in accord with the merchant's returned goods policies.

Assuming that a customer returns the goods that were originally purchased by the customer in an acceptable condition, the merchant must determine how to dispose of the goods. This aspect of handling returned goods can be particularly troublesome, because most merchants are not properly equipped to deal with returned goods that cannot be simply reshelved for resale. In some cases, the condition or nature of the goods will preclude them from being repackaged for resale. In other cases, a portion of the returned goods may be salvaged, but the remainder will need to be discarded in an acceptable manner. For other situations, a merchant will prefer to donate the returned goods to an acceptable charitable cause, thereby enjoying the benefit of a tax write-off for the value of the donation. Certain types of goods may represent an environmental hazard if improperly disposed of and will require special handling, in accord with criteria set forth for toxic or hazardous waste. Most merchants do not have the facilities or staff to assess the condition of returned merchandise and to carry out the steps that need to be taken for appropriate handling of the returned goods. Accordingly, it will be evident that it would be preferable to provide a centralized returned merchandise handling agency to process returned merchandise for a plurality of different merchants. Such a centralized agency will be able to more efficiently process returned merchandise than could any individual merchant.

SUMMARY OF THE INVENTION

In accord with the present invention, a method is defined for handling returned merchandise on behalf of a plurality of different merchants. The method provides that merchants transmit data relating to merchandise that might be returned by customers of the merchants to a central database. The data identify the merchant and the merchandise purchased by a customer, and include contact information for the customer. A return label is provided to the customer for inclusion with the merchandise being returned and includes information referencing at least a portion of the data stored in the central database. The return label can be provided with the merchandise when purchased by the customer, and if so, can be usable without obtaining further permission to return the merchandise, or alternatively, is usable only after permission to return the merchandise has been requested and granted. As a further alternative, the return label can be sent to the customer for use after permission to return merchandise has been requested by the customer and granted.

Upon receipt of merchandise that has been returned by the customer, at least part of the information included on the return label is entered into the central database to indicate that the merchandise has been received. The condition of the merchandise is then assessed. A tag is associated with the merchandise to indicate how the merchandise should be disposed, based upon the condition of the merchandise as received. The merchandise is thereafter automatically routed to a station designated for the temporary storage and subsequent disposition of the merchandise as indicated on the tag.

Preferably, the return label comprises a scannable code. To enter at least part of the information, the return label is scanned. Similarly, the tag associated with the merchandise also preferably comprises a scannable code. The tag is thus readily scanned to determine the disposition of the merchandise and to facilitate automatically routing the merchandise to the appropriate station for its disposition. The station designated for the disposition comprises a storage repository designated to hold returned merchandise that have been allocated for a common disposition.

The method also includes the step of electronically reporting receipt of the merchandise that was returned to the merchant who transmitted the data identifying the merchandise. The report indicates the condition and the disposition of the merchandise to the merchant. The account of the customer returning merchandise is credited for the value of the merchandise being returned at any time specified by the merchant from whom the customer purchased the merchandise, but the customer's account is subsequently debited for this value if the merchandised that has been returned fails to meet a condition specified by the merchant. A report regarding the status and/or condition of the merchandise is optionally provided to the merchant at any desired point in the processing of the returned merchandise. The report is preferably electronically posted on a network accessible by the merchant (such as the Internet), showing the status and/or condition of the merchandise that has been returned. In this way, the merchant can track the handling of the returned merchandise through its final disposition.

The options for disposition of the merchandise include salvaging at least one useful component from the merchandise and discarding the remainder of the merchandise, refurbishing and repackaging the merchandise for resale, donating the merchandise to benefit a selected charity, discarding the merchandise in an appropriate waste disposal facility, and returning the merchandise to the inventory of the merchant.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
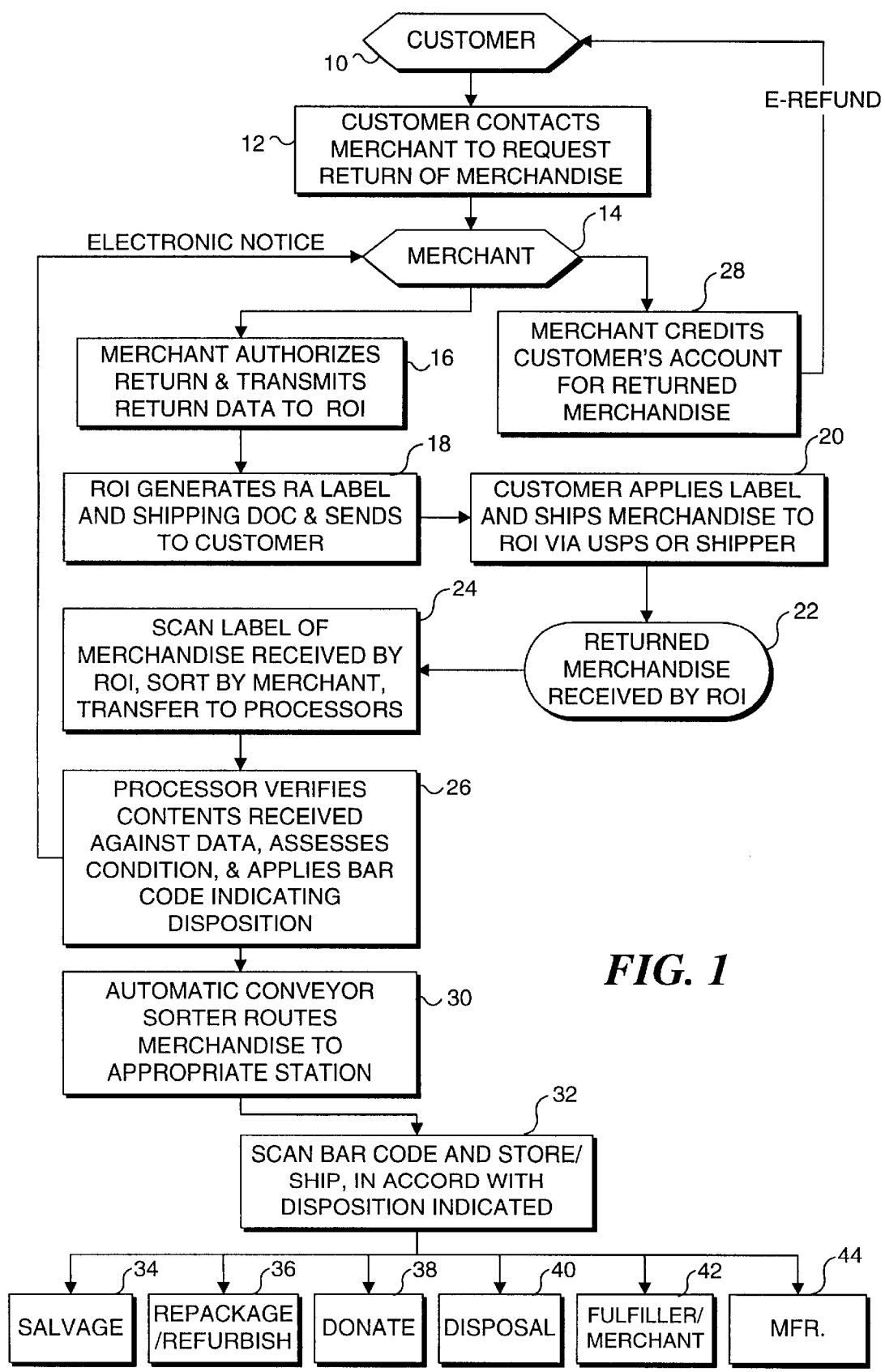
FIG. 1 is a flow chart illustrating the steps implemented in the present invention.

The logical steps implemented in carrying out the present invention are shown generally in FIG. 1. The process is typically initiated when, as indicated in a block 12, a customer 10 contacts a merchant 14 to request authorization to return merchandise to the merchant from whom the merchandise was originally purchased. There are many reasons why a customer will want to return merchandise. For example, merchandise may be of an improper size or color, or otherwise fail to meet the requirements of the customer, or the merchandise may be defective, or may have been supplied to the customer in an incomplete form. The requirements set forth by different merchants to justify granting of an authorization to return merchandise vary from industry to industry, and will often depend upon the nature of the merchandise. Assuming that all of the conditions for return of the merchandise are met, merchant 14 will authorize the customer to return the merchandise to the central return facility, in accord with the present invention. The NATIONAL RETURN CENTER™ is such a central return facility that has been created by Returns Online, Inc. to efficiently service returned merchandise for a plurality of different merchants.

In some cases, a merchant might ship merchandise that was dropped off by the customer, to this central return facility. However, it is more likely that in most cases, the customer will be the party that ships the merchandise being returned to the return facility. As indicated in a block 16, before any merchandise will be accepted, merchant 14 must authorize the return and transmit the return data to Returns Online, Inc. for inclusion in its database. It will be most convenient to transmit the data electronically, either over the Internet, or via a dedicated data line provided for each merchant who elects to use the central return services provided by Returns Online, Inc. The data transmitted to Returns Online, Inc. by a merchant who has authorized the return of merchandise will identify the customer who requested the return and the merchant authorizing the return, will indicate the address and other contact information for the customer, and will include a description of the merchandise that identifies all items that should be included.

Upon receiving the data from a merchant who has authorized the return of merchandise, Returns Online, Inc. will generate a return authorization shipping label as indicated in a block 18. The shipping label will include a bar code identifying the merchant authorizing the return and including any other information that is relevant to processing the return of the merchandise. Included on the return authorization shipping label is the address for Returns Online, Inc. Other options for providing the return authorization shipping label are discussed below in greater detail. In addition, Returns Online, Inc. may include either a prepaid United States Postal Service Postage Permit or other private shipper forms that can be used by the customer returning the merchandise to facilitate shipment of the merchandise to Returns Online, Inc. These labels will be sent to each customer returning merchandise through conventional U.S. Postal Service mail or by email in an electronic form that can be printed by the customer, providing the appropriate printable bar-coded return authorization shipping label for facilitating shipment of the merchandise to Returns Online, Inc.

Upon receiving the return authorization label, as indicated in a block 20, the customer will pack the merchandise to be returned in an appropriate container, apply the label to the container, and will then arrange for shipment of the merchandise to the central return facility of Returns Online, Inc. At the customer's option, the returned merchandise can be conveyed by the U.S. Postal Service using the U.S. Postal Service Postage Permit or by a private shipper. If using the U.S. Postal Service, the customer will leave the container at a postal drop box at the U.S. Post Office, or at the customer's mail box or doorstep. If a private shipper is elected, the shipper will likely pick up the container from the customer's residence or other location.

Returned merchandise shipped through the U.S. Postal Service or via a private shipper is received by Returns Online, Inc. at its central return facility, as indicated in a block 22. A block 24 indicates that Returns Online, Inc. scans the return authorization label applied to the shipping container of merchandise that has been received. Based upon the merchant identified by the bar code on the shipping label, the container conveying the merchandise is sorted and transferred to an appropriate processor station.

At the processor station, as indicated in a block 26, the contents of a shipping container are inspected and the processor verifies that the contents received in the container match the expected contents, based upon the data received from the merchant who authorized the return shipment. In addition, the processor assesses the condition of the merchandise. The processor produces a bar code tag that is applied to the merchandise or its container indicating the final disposition of the merchandise, in accord with instructions received from the merchant and depending upon the assessed condition of the returned merchandise. The disposition indicated on the bar code tag is thus dependent upon the nature of the returned merchandise, the instructions from the merchant, and/or upon the condition of the returned merchandise.

If the contents of the container that was received match the expected merchandise, the processing station sends an electronic transmission to merchant 14 indicating that a complete return of the merchandise occurred, as indicated by the line from block 26 back to block 14. Alternatively, the message may indicate that the return was incomplete or that the returned merchandise exhibits excessive wear or likely customer damage. Fraudulent returns are also detected at this point. The electronic message transmitted back to merchant 14 will thus indicate the condition of the returned merchandise. If the merchandise has been completely returned in an expected condition, the merchant will credit the customer's account for the returned merchandise, as indicated in a block 28. Customer 10 receives the refund, as indicated by the line from block 28 back to block 10.

However, it is contemplated that refunds can alternatively be credited to a customer's account for returned merchandise at any time during the process designated by a merchant. For example, when a customer initially requests authorization to return merchandise, the customer's account can be credited for the cost of the merchandise being returned or a check in the amount of the credit can be mailed to the customer. In the event that the merchandise is either not returned by the customer, or if some other condition established by the merchant such as the condition or completeness of the return is not met, the customer's account will be debited in the amount previously credited. If the credit was paid to the customer, an invoice for the amount of the credit will be sent to the customer, or the matter will be otherwise handled as the merchant involved has directed.

In a block 30, the merchandise that has been inspected at the processor station is then conveyed by an automatic conveyer, which sorts and routes the merchandise to an appropriate station by automatically scanning the bar code tag that was applied to the container or merchandise in block 26. In accord with a block 32, the merchandise is directed to an appropriate temporary storage bin in which it is stored until it is subsequently disposed of as indicated on the bar code applied to the tag at the processing station.

Several exemplary options for disposing of returned merchandise are indicated in blocks 34–44. Certain types of merchandise, by their nature, may not be completely reusable, but may include components that are sufficiently valuable to justify salvage, as indicated in a block 34. For example, it may be too expensive to attempt to repair a defective returned electronic product, such as an electronic game. However, the display screen on such a product, if still operative, may comprise a substantial portion of the entire cost of the product when it was originally manufactured. Accordingly, valuable components of such a product can be salvaged for further use in new products being manufactured.

A block 36 indicates that certain goods will require repackaging or refurbishing, e.g., to replace a blister pack or other packaging destroyed when the customer originally opened the product prior to returning it. Repackaging and refurbishing the product will typically place the product in a saleable condition, assuming that it is not otherwise defective and has not been adversely affected by any use of the previous customer.

For other merchandise that is returned, there may be a substantial tax benefit to the merchant to donate the returned merchandise to a recognized charity, in accord with a block 38. The merchant should then be able to take a tax write-off corresponding to the fair market value of the returned merchandise donated to a charitable organization. Some returned merchandise will have no further useful value upon being returned and will thus best be disposed in accord with accepted waste management practices, as indicated in a block 40. Returned merchandise that is reusable and can be sold to another customer can alternatively be transmitted to a fulfiller/merchant, as indicated in a block 42. In some cases, the retailer will mark such merchandise as "returned goods." However, other merchandise that has been returned can be sold "as new." For example, software that has been returned can likely be resold as new.

In other cases, the returned merchandise will be shipped to the original manufacturer, for possible use in manufacturing new goods of a related nature. This disposition option is noted in a block 44.

Figure 2:
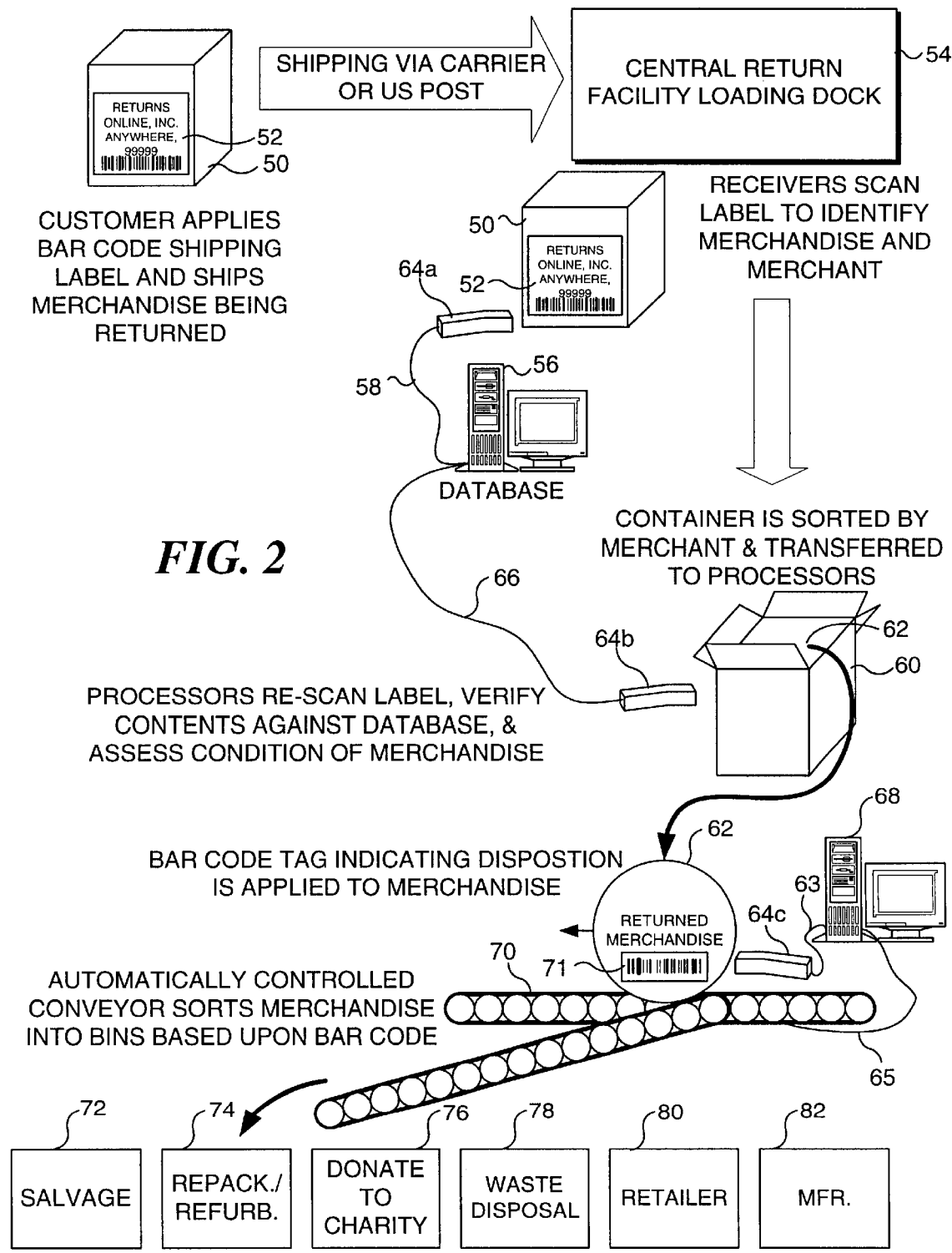
FIG. 2 is a block diagram illustrating the processing of returned merchandise that has been received at a central processing facility.

Further details related to the processing of returned merchandise are illustrated in FIG. 2. In this illustration, an exemplary container 50 is shown in which a customer has packed merchandise to be returned. The return of this merchandise has previously been authorized by a merchant, and having been advised of the authorization by the merchant, Returns Online, Inc. has provided the customer with a return authorization label 52 that includes the address for Returns Online, Inc. and a bar code that is scannable for identifying the merchant and merchandise being returned. Container 50 is then shipped via a private shipping company or through the U.S. Postal Service to a central return facility, i.e., to a loading dock 54, which receives all of the packages returned from customers of merchants who are clients of Returns Online, Inc. From the loading dock, container 50 is directed to a receiving station where return authorization label 52 is scanned using a scanner 64a, so that the data included in the scannable bar code can be entered within a database maintained on a computer 56. Scanner 64a is coupled to computer 56 via a lead 58. Once the receiving station scans a return authorization label to identify the merchant who authorized the return, the container is sorted along with other returned merchandise received, based upon the information from the merchant who authorized the return of the merchandise. The container is then transferred to a processor station. The processor at this station inspects returned merchandise 62 inside a container 60 and rescans the return authorization shipping label with a scanner 64b that is connected to computer 56 through a lead 66. The contents of container 50 are verified against the expected contents as indicated in the data stored in the database on computer 56.

A bar code tag 71 indicating the disposition is applied to the returned merchandise or to container 60, and container 60 and/or returned merchandise 62 is directed onto an automated conveyer system 70. As the merchandise is moved by the conveyer system, the disposition indicated on bar code tag 71 is scanned using a scanner 64c, which is coupled through a lead 63 to a computer 68. In response to the disposition indicated by scannable bar code tag 71, computer 68 controls conveyer system 70 via control signals conveyed by a lead 65, to direct the returned merchandise to an appropriate temporary storage bin selected from among bins 72–82. Each of these bins is allocated to hold merchandise that has been assigned to a common disposition. Once a bin is filled, it is shipped for disposition as indicated on the bar code tag provided for all of the returned merchandise that it contains.

Figure 3:
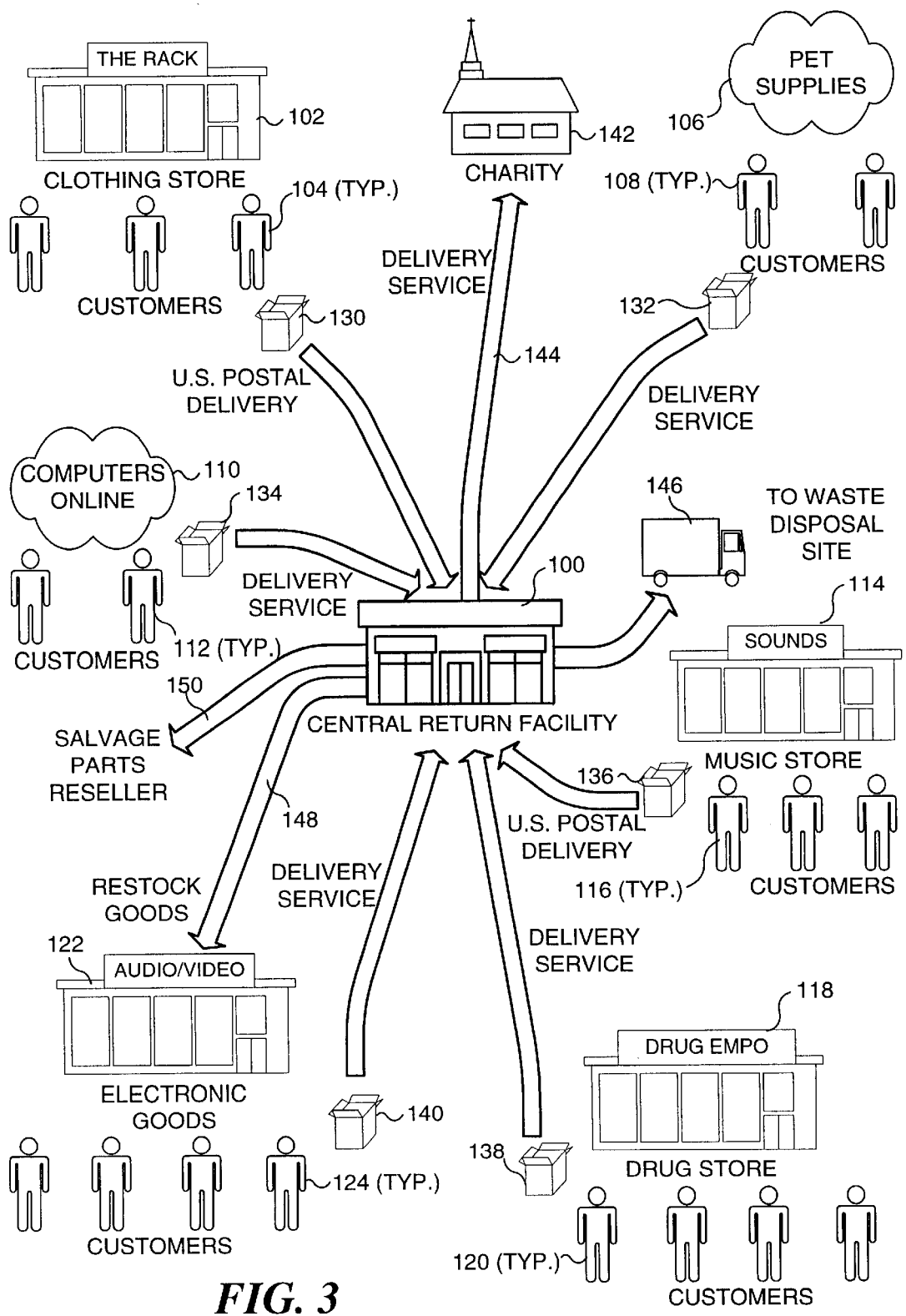
FIG. 3 is a schematic diagram illustrating the interaction between the merchants that subscribe to the central return merchandise processing service, their customers who are returning merchandise, the facilities, and several of the options for disposition of the merchandise.

In FIG. 3, the relationship between a central return facility 100 operated by Returns Online, Inc., the merchants that make use of the facility, and the customers of those merchants is graphically illustrated. Central return facility 100 will service the returned merchandise for a plurality of different merchants including a clothing store 102 having customers 104, a pet supplies Internet merchant 106 who sells pet supplies to customers 108, a computers online vendor 110 who sells to customers 112, a music store 114 that sells music CDs and videos to customers 116, a drugstore 118 that sells to customers 120, and an electronic goods store 122 that sells to customers 124. It should be noted that the merchants used in this exemplary illustration are not in any way intended to limit the types of merchants that will use the central return facility provided in accord with the present invention. However, it should be noted that the merchants shown in this example are of both the "brick and mortar" type and of the "online" type that sell goods and services over the Internet.

Any of the customers of these client merchants may want to return merchandise purchased from any of the client merchants, e.g., due to improper fit, defects, wrong color, etc. Accordingly, a plurality of containers 130, 132, 134, 136, 138, and 140 are illustrated in association with at least one customer of each client merchant. The customer of a merchant will have contacted the merchant for authorization to return merchandise. In each case, the container that is being returned includes merchandise purchased from a client merchant and is sent either via the U.S. Postal Service or through a private carrier to central return facility 100, for example, to a facility operated by Returns Online. Inc.

Processing of merchandise that have been received by the central return facility is as described above. It should be noted that the status of any of the merchandise that is returned to central return facility 100, once it has been received and its return authorization shipping label has been scanned, will be available online so that the merchant who has authorized the return can track the disposition of the merchandise received by central return facility 100.

After the returned merchandise has been processed as described above, it is conveyed in a bin (along with other returned merchandise assigned the same disposition) to the assigned disposition. For example, returned merchandise that is to be donated to a charity are conveyed as indicated by an arrow 144, using a delivery service, to a charitable institution such as a church 142. Returned merchandise designated for disposal is shipped by a truck 146 to an appropriate waste disposal site. Repackaged/refurbished returned merchandise is shipped as indicated by an arrow 148, prepaid to the merchant that authorized the return, such as electronic goods store 122, where the returned merchandise is restocked for resale. Similarly, an arrow 150 indicates that returned merchandise designated for salvage is shipped to a salvage parts reseller.

Other dispositions discussed above are not illustrated in FIG. 3, since space does not permit. However, it will be understood that in addition to the disposition options indicated, other options for disposition of returned merchandise can be implemented in accord with the present invention.

Figure 4:
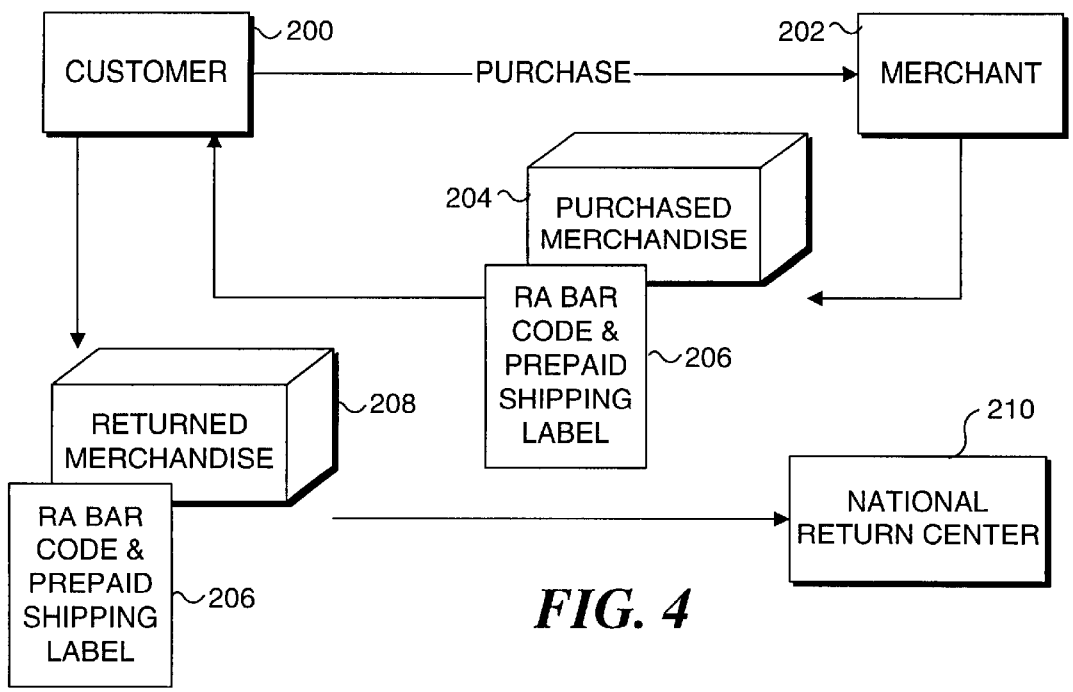
FIG. 4 is a block diagram illustrating a first option for providing a return authorization bar code and prepaid shipping label to a customer for use in returning merchandise.

As noted above, several alternative approaches are contemplated in regard to the present invention for providing the shipping label that is bar-coded and for facilitating return of merchandise. FIG. 4 illustrates a first approach in which the customer 200 receives purchased merchandise 204 with which is included a return authorization code and prepaid shipping label 206 from a merchant 202. In the approach shown in FIG. 4, merchant 202 has elected to pre-authorize customers to return any purchased merchandise with which the customers are dissatisfied, without the need to obtain further authorization for the return. Thus, when a customer makes a purchase, the authorization to return that merchandise is automatically provided. If dissatisfied with purchased merchandise 204 for any reason, customer 200 simply repackages the goods, applies return authorization bar code and prepaid shipping label 206, and arranges for shipment of returned merchandise 208 to NATIONAL RETURN, CENTER™ 210, as described above.

Figure 5:
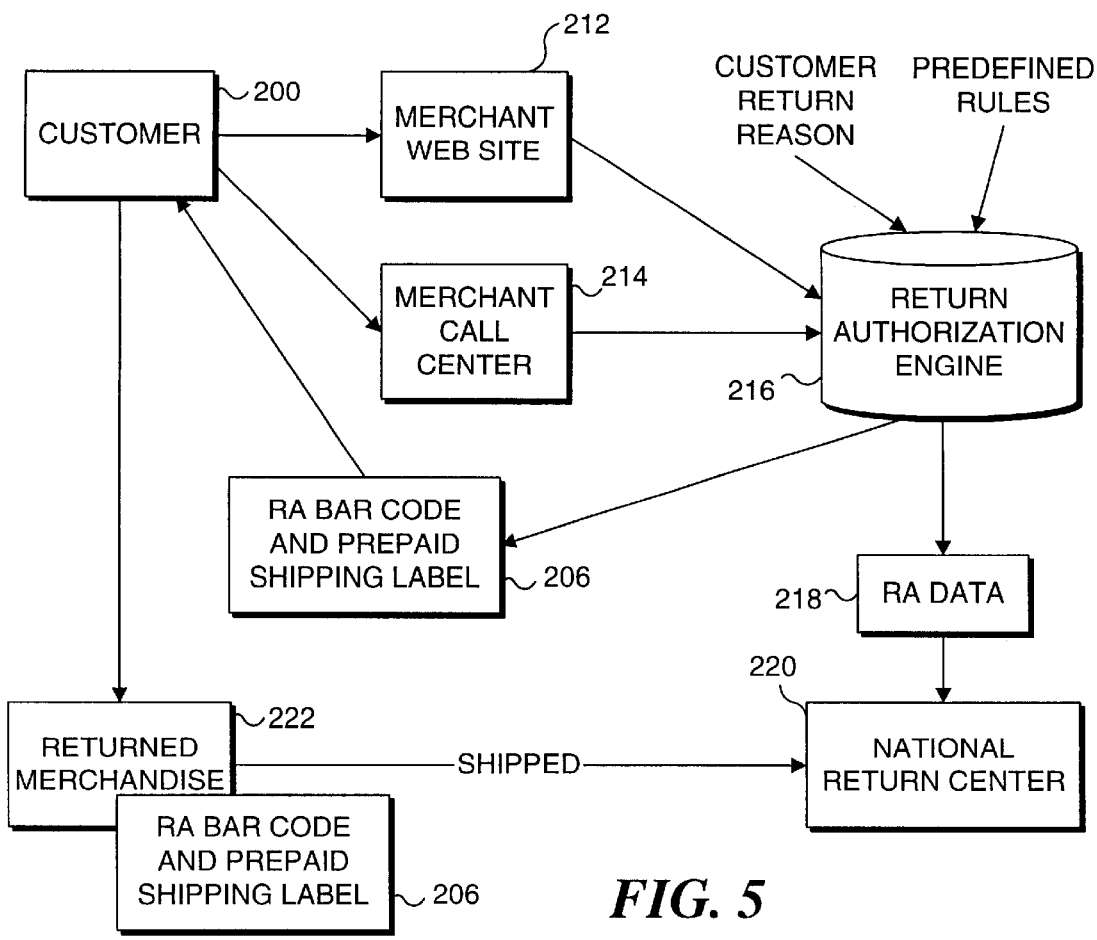
FIG. 5 is a block diagram illustrating a second option for providing a return authorization bar code and prepaid shipping label to a customer for use in returning merchandise.

FIG. 5 illustrates a more likely approach for handling the authorization to return merchandise. As shown in this Figure, customer 200 either contacts a merchant web site 212 over the Internet or alternatively, telephones a merchant call center 214 and is connected with an operator. If the customer contacts the merchant web site, an interactive form will be provided that enables the customer to provide the same information solicited by the operator if the customer had instead called the merchant call center. In either case, the customer requests authorization to return merchandise previously purchased and indicates why the merchandise should be returned.

For each type of merchandise, a plurality of different codes will be provided, each associated with a different potential reason for returning the merchandise. For example, a different code will be associated with reasons such as: Repair/Service Merchandise, Damaged/Defective Product, Wrong Fit, Error in Product Supplied (e.g., wrong color, fit, or product), Don't Want, Didn't Match Description or Picture, Arrived too Late, etc. A return authorization engine 216 will be provided to compare the code associated with the customer's reason for returning the merchandise with rules that have been predefined as justifying a return, exchange, or other resolution. Typically, these rules will be established by the merchant from whom the customer purchased the merchandise. If the coded reason for making the return satisfies the predefined rules, the return authorization engine will automatically send return authorization bar code and prepaid shipping label 206 to the customer. If the customer wants to make an exchange, an operator handling the communication with the customer at a call center (or the customer, if the customer has contacted the manufacturer's web site) will preferably be automatically routed to an order page to enable the customer to order replacement merchandise.

The return authorization bar code and prepaid shipping label required for returning merchandise can either be sent through the mail, or can be provided as a printable attachment to an e-mail, enabling the customer to print the label. This e-mail may include additional messages and/or incentive coupons. Customer 200 then applies the return authorization bar code and prepaid shipping label to a container 222 in which the merchandise being returned is packed, and arranges for shipment of the merchandise to the NATIONAL RETURN CENTER™, as explained above.

Figure 6A:
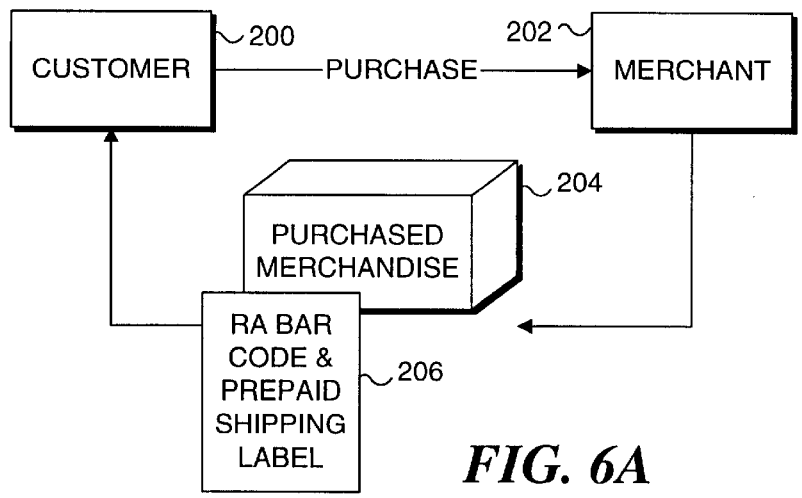
FIG. 6A and 6B are block diagrams respectively illustrating the purchase of merchandise that includes a return bar code and prepaid shipping label and the control exercised in authorizing the return of merchandise.
Figure 6B:
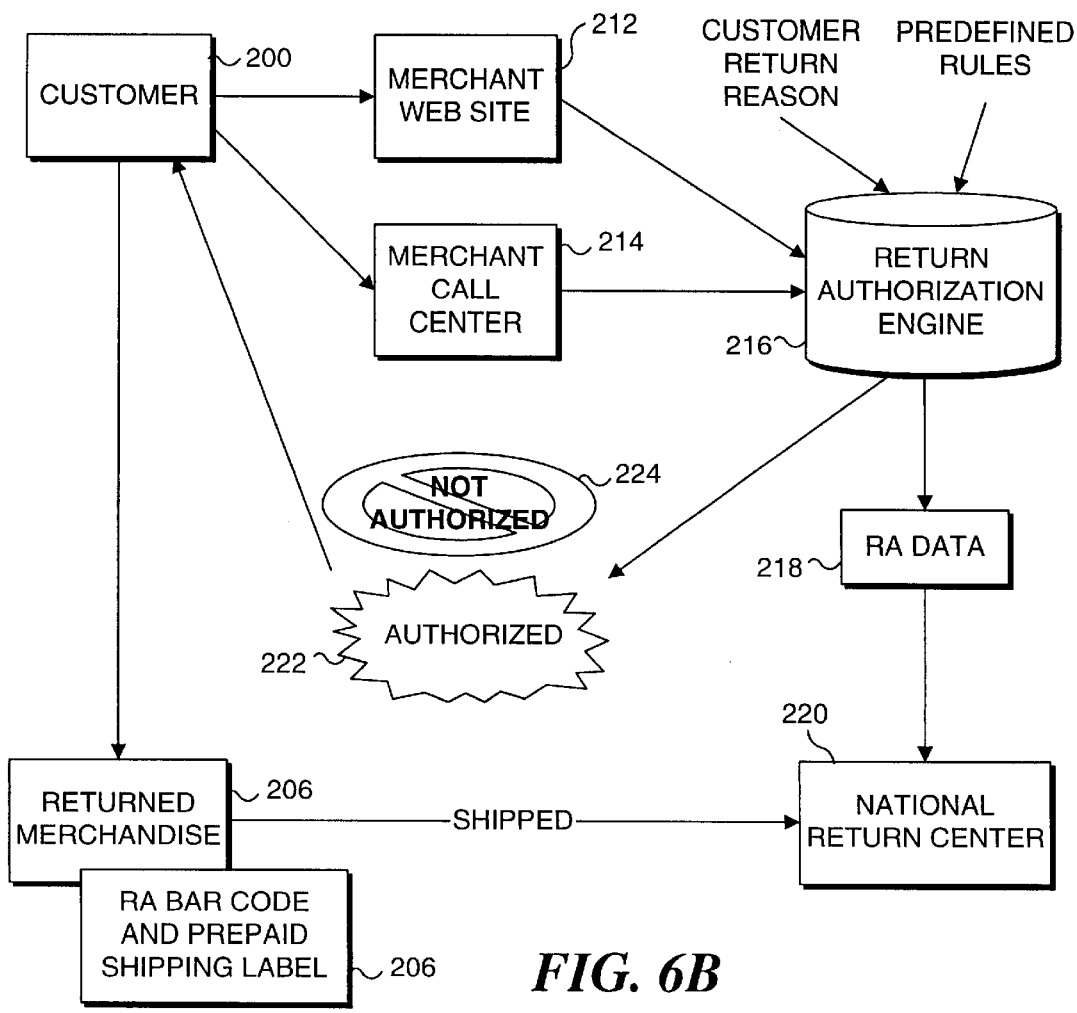

Yet another approach for providing the return authorization bar code and prepaid shipping label and authorizing the return of merchandise is illustrated in FIGS. 6A and 6B. This approach is a combination of the preceding two approaches. As shown in FIG. 6A, the customer receives the return authorization bar code and prepaid shipping label with the purchased merchandise at the time a purchase is made. However, as shown in FIG. 6B, the customer is required to obtain authorization prior to returning, the merchandise. Just as discussed in connection with FIG. 5, the customer must contact either merchant web site 212 or merchant call center 214 to request authorization to return the merchandise. If the reason given by the customer satisfies the predefined rules, the return authorization engine provides the authorization for the return of the merchandise, as indicated in a block 222. Conversely, if the reason provided by the customer does not satisfy the predefined rules, the return is not authorized, as indicated in a block 224. Only if customer 200 has been authorized to make a return of the merchandise will returned merchandise 206 be accepted by NATIONAL RETURN CENTER™ 220. When properly authorized to make a return of the merchandise, the customer will apply the return authorization bar code and prepaid shipping label that was provided with the merchandise when purchased and arrange for shipment of the merchandise to the NATIONAL RETURN CENTER™ as previously noted above.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for handling returned merchandise on behalf of a plurality of different merchants, comprising the steps of:
   (a) enabling a merchant to transmit data to a central database identifying merchandise that might be returned by a customer, said data identifying the merchant and the merchandise, and including contact information for the customer;
   (b) providing a return shipping label to the customer for use in returning the merchandise, said return label including information referencing at least a portion of the data stored in the central database;
   (c) entering at least part of the information included on the return shipping label into the central database upon receipt of merchandise returned by the customer, to indicate that the merchandise being returned has been received;
   (d) assessing a condition of the merchandise that was received and associating a tag with said merchandise indicating a disposition thereof;
   (e) automatically routing the merchandise to a station for implementing the disposition of the merchandise, as indicated by the tag; and
   (f) disposing of the merchandise, as indicated by the tag.

2. The method of claim 1, wherein the return shipping label comprises a scannable code, and wherein the step of entering at least part of the information comprises the step of scanning the return shipping label.

3. The method of claim 1, wherein the tag associated with the merchandise comprises a scannable code, and wherein the step of automatically routing the merchandise comprises the step of scanning the tag to determine the disposition of the merchandise and thereby controlling the automatic routing of the merchandise.

4. The method of claim 1, wherein the station comprises a storage repository designated to hold returned merchandise that have all been allocated for a common disposition.

5. The method of claim 1, further comprising the step of electronically reporting receipt of the merchandise that was returned, to the merchant that transmitted the data identifying the merchandise, and indicating a condition and a disposition of the merchandise to said merchant.

6. The method of claim 1, further comprising the step of enabling the customer to selectively return the merchandise by one of a postal shipment and a shipping service.

7. The method of claim 1, further comprising the step of providing a notice to the merchant indicating a status of the merchandise that has been returned at any step in the handling of the returned merchandise requested by the merchant.

8. The method of claim 1, further comprising the step of electronically posting a status report on a network accessible by the merchant, indicating the status of the merchandise that has been returned.

9. The method of claim 1, wherein the disposition of the merchandise includes at least one of:
   (a) salvaging at least one useful component from the merchandise and discarding a remainder of the merchandise that was returned;
   (b) refurbishing and repackaging the merchandise that was returned for resale;
   (c) donating the merchandise that was returned to benefit a selected charity;
   (d) discarding the merchandise in an appropriate waste disposal facility;
   (e) returning the merchandise to inventory for resale; and
   (f) returning the merchandise to a manufacturer of the merchandise.

10. The method of claim 1, further comprising the step enabling a refund to the customer returning merchandise at any point during the return and the handling of the returned merchandise, as specified by the merchant.

11. The method of claim 1, wherein the step of providing the return shipping label comprises the step of sending the return shipping label to the customer only after return of the merchandise has been authorized.

12. The method of claim 1, wherein the step of providing the return shipping label comprises the step of including the return shipping label with the merchandise when the merchandise was purchased by the customer.

13. The method of claim 1, wherein the step of providing the return shipping label comprises the step of sending an email to the customer to which is attached a printable return shipping label.

14. The method of claim 1, wherein the step of providing the return shipping label comprises the step of automatically providing the return shipping label to the customer, but only if predetermined conditions set by the merchant are met.

15. A method for facilitating return of merchandise by customers of a plurality of different merchants, comprising the steps of:
   (a) receiving electronically transmitted data regarding return authorizations from each merchant that were provided to customers of the merchants, said data for each return authorization identifying a customer, the merchandise authorized to be returned, and a merchant authorizing return of the merchandise;
   (b) producing shipping labels, each shipping label including a scannable code referencing the data regarding a return authorization for return of merchandise authorized by a merchant and which includes an address to which the merchandise is to be shipped when being returned;
   (c) providing the shipping labels to the customers for application to shipping containers in which the merchandise is to be returned;
   (d) receiving the merchandise that was returned by the customers;
   (e) scanning the shipping labels of the merchandise that has been received and sorting said merchandise based upon the merchant that is identified on each shipping label as having authorized the return of the merchandise;

(f) assessing contents of the shipping containers to determine a condition of the merchandise in each shipping container, and to assign a disposition for the merchandise;

(g) producing scannable tags that are associated with the merchandise, said scannable tags indicating the disposition of the merchandise that was received;

(h) automatically sorting and routing the merchandise to temporary storage, by scanning the tags associated with the merchandise to determine the disposition assigned, a different temporary storage being provided for each different type of disposition assigned to the merchandise; and (i) disposing of the merchandise temporarily stored in accord with the disposition assigned to the merchandise.

16. The method of claim 15, wherein each different temporary storage comprises a bin, further comprising the step of transferring the bin and merchandise temporarily stored therein to a site that implements the disposition of the merchandise in accord with the disposition that was assigned to the merchandise temporarily stored in the bin.

17. The method of claim 15, wherein the step of assessing is implemented at a plurality of processor stations; and wherein the step of assigning a disposition comprises the step of acting in accord with instructions provided by the merchant who originally sold the merchandise to which the disposition is being assigned.

18. The method of claim 15, wherein the step of disposing of the merchandise comprises at least one of the steps of:

(a) salvaging any usable components from the merchandise;

(b) repackaging the merchandise;

(c) transferring the merchandise to a charitable organization;

(d) depositing the merchandise at an appropriate waste disposal site;

(e) restocking the merchandise for resale; and (f) returning the merchandise to a manufacturer of the merchandise.

19. The method of claim 15, further comprising the step of verifying the merchandise against the data to ensure that the merchandise returned is complete and is merchandise for which return was authorized by the merchant.

20. The method of claim 19, further comprising the step of notifying the merchant who authorized return of the merchandise, of results of the step of verifying.

21. The method of claim 15, wherein the step of automatically sorting and routing is implemented with automatically controlled conveyors.

22. The method of claim 15, wherein the step of providing the shipping labels comprises one of the steps of:

(a) including a shipping label with the merchandise at the time of sale of the merchandise, authorization for the customer to return the merchandise if dissatisfied for any reason being then provided by the merchant;

(b) including a shipping label with the merchandise at the time of sale of the merchandise, but requiring the customer to obtain authorization to return the merchandise before using the shipping label to return the merchandise; and (c) sending a shipping label to a customer only after authorization to return the merchandise has been requested by the customer and has been granted.

23. The method of claim 15, further comprising the step of providing to a merchant an online status of merchandise being returned by a customer.

24. A method for expediting handling of merchandise purchased from a plurality of different merchants that is being returned by customers, comprising the steps of:

(a) providing a receiving facility for accepting returned merchandise at a defined address;

(b) receiving electronically transmitted data from each merchant who has authorized return of merchandise, said data identifying the merchandise authorized to be returned and the merchant that authorized return of the merchandise;

(c) providing bar-coded shipping labels to customers for use when the customers have been authorized to return merchandise, said bar-coded shipping labels including the defined address and indicating the merchandise and the merchant authorizing the return;

(d) receiving returned merchandise from customers and scanning the bar-coded labels to identify the merchandise and the merchants authorizing return of the merchandise;

(e) sorting returned merchandise received based on the merchant who authorized return of said merchandise;

(f) assessing a condition of the merchandise received and comparing the merchandise received to the data received from the merchants;

(g) automatically assigning a disposition of the merchandise received based upon the condition of the merchandise; and (h) disposing of the merchandise received in accord with the disposition assigned.

25. The method of claim 24, further comprising the step of advising the merchant whether the merchandise received from a customer corresponds to the merchandise authorized to be returned.

26. The method of claim 24, further comprising the step of issuing a credit to the customer for return of the merchandise.

27. The method of claim 24, wherein the step of automatically assigning the disposition of the merchandise is carried out in accord with instructions provided by the merchants.

28. The method of claim 24, wherein the step of providing the bar-coded shipping labels comprises one of the following steps:

(a) providing a bar-coded shipping label when the customer purchases merchandise, said customer being then authorized to return the merchandise at that time if dissatisfied with the merchandise;

(b) providing a bar-coded shipping label when the customer purchases merchandise, said customer being required to request and receive authorization to return the merchandise before using the bar-coded shipping label to return the merchandise; and (c) providing a bar-coded shipping label to a customer after the customer has requested and been granted authorization to return the merchandise.

29. The method of claim 24, wherein the step of providing the bar-coded shipping labels comprises the steps of electronically sending a bar-coded shipping label to a customer and enabling the customer to print the bar-coded shipping label.

30. The method of claim 24, further comprising the step of authorizing a customer to return merchandise only if a condition established by the merchant from whom the merchandise was purchased has been met.

31. The method of claim 24, further comprising the step of crediting an account of a customer who is returning merchandise for a value of the merchandise being returned, when specified by the merchant from whom the customer purchased the merchandise.

32. The method of claim 31, further comprising the step of debiting the account of the customer previously credited for the value of the merchandise being returned, if a condition established by the merchant for the return is subsequently found not to have been met after the step of assessing the condition of the returned merchandise.

* * * * *